United States Patent
Kanagovi et al.

(10) Patent No.: US 11,507,602 B2
(45) Date of Patent: Nov. 22, 2022

(54) METHOD AND SYSTEM FOR PRIORITIZING SYSTEM UNDER TEST CONFIGURATIONS

(71) Applicant: Dell Products L.P., Round Rock, TX (US)

(72) Inventors: Ramakanth Kanagovi, Bangalore (IN); Saheli Saha, Bangalore (IN); Kevin P. Olalde, McMurray, PA (US); Geoffrey S. Meyer, Austin, TX (US); Sunil A. Vyas, Austin, TX (US); Erik Reyes, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 611 days.

(21) Appl. No.: 16/670,075

(22) Filed: Oct. 31, 2019

(65) Prior Publication Data
US 2021/0133210 A1    May 6, 2021

(51) Int. Cl.
*G06F 16/28*    (2019.01)
*G06N 3/04*    (2006.01)
*G06N 20/00*    (2019.01)

(52) U.S. Cl.
CPC ............ *G06F 16/285* (2019.01); *G06N 3/04* (2013.01); *G06N 20/00* (2019.01)

(58) Field of Classification Search
CPC ......... G06F 16/285; G06N 20/00; G06N 3/04
USPC .......................................................... 706/20
See application file for complete search history.

(56) References Cited

U.S. PATENT DOCUMENTS

| | | | |
|---|---|---|---|
| 2013/0160129 A1* | 6/2013 | Sartin | G06F 21/552 726/25 |
| 2020/0293436 A1* | 9/2020 | Carames | G06F 11/3688 |
| 2022/0129172 A1* | 4/2022 | Nagarajegowda | G06F 21/554 |

FOREIGN PATENT DOCUMENTS

| | | | |
|---|---|---|---|
| CN | 103260050 A | * | 8/2013 |
| JP | 2017027278 A | * | 2/2017 |

OTHER PUBLICATIONS

Akue et al., "Runtime configuration validation for self-configurable systems," 2013 IFIP/IEEE International Symposium on Integrated Network Management (IM 2013), 2013, pp. 712-715. (Year: 2013).*

IEEE, "IEEE Standard for System and Software Verification and Validation," in IEEE Std 1012-2012 (Revision of IEEE Std 1012-2004), vol., No., pp. 1-223, May 25, 2012, doi: 10.1109/IEEESTD.2012.6204026. (Year: 2012).*

(Continued)

*Primary Examiner* — Peter C Shaw
(74) *Attorney, Agent, or Firm* — Terrile, Cannatti & Chambers; Stephen A. Terrile

(57) ABSTRACT

A system, method, and computer-readable medium are provided that engages in a data-driven and machine learning-based approach to arrive at high-value, system under test configurations for validation. Embodiments determine all the possible configurations for a computer platform, considering the variety of processors, boards, adapters, and the like, and then utilize a pseudo-ensemble clustering methodology that combines a k-means clustering technique with a neural-network based Kohenon self-organizing map competitive clustering technique to associate like configurations, and then utilizes a data-driven scoring methodology on the clustered configurations to prioritize those configurations to be validation tested.

18 Claims, 4 Drawing Sheets

(56) References Cited

OTHER PUBLICATIONS

Xie et al., "Component-based hardware/software co-verification," Fourth ACM and IEEE International Conference on Formal Methods and Models for Co-Design, 2006. MEMOCODE'06. Proceedings., 2006, pp. 27-36, doi: 10.1109/MEMCOD.2006.1695897. (Year: 2006).*

Bestoun S. Ahmed, Test case minimization approach using fault detection and combinatorial optimization techniques for configuration-aware structural testing, 2015 https://www.sciencedirect.com/science/article/pii/S2215098615001706.

* cited by examiner

METHOD AND SYSTEM FOR PRIORITIZING SYSTEM UNDER TEST CONFIGURATIONS

BACKGROUND OF THE INVENTION

Field of the Invention

The present invention relates to information handling systems. More specifically, embodiments of the invention relate to a mechanism for a data-driven and machine learning approach to prioritizing system configurations to test for validation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. In addition, information handling systems may include a variety of hardware and software components that may be configured to process, store, and communicate information and may include one or more computer systems, data storage systems, and networking systems.

Prior to a launch of any new generation information handling system or computer platform, or new releases on existing platforms, a supplier of such systems engages in quality assurance of all new features contained within the platforms. For quality assurance purposes, test engineers can build system configurations by combining a wide variety of components, such as processors, memories, hard drives, host bus adapters, network interface cards, graphics processors, and the like. For each component type, there can be a multitude of different component instances each having a variety of vendors and form factors. Permutations of computer platform configurations can result in millions of valid configurations for a platform. With the limited resources, budget, and time that validation test engineers have, it is not practical to perform validation tests on every possible configuration. Validation testing thus needs to choose a limited set (e.g., 20-50) of system under test configurations that covers a broadest subset of the possible permutations.

Historically, the set of system under test configurations chosen has been based on background knowledge of the product domain and cues taken from historically tested configurations. Such an approach leaves gaps in validation testing of the entire domain, especially when considering new technology components. It is therefore desirable to have an approach that addresses problems and concerns related to the current methodology by providing a data-driven approach to arriving at a set of high value system under test configurations for validation.

SUMMARY OF THE INVENTION

A system, method, and computer-readable medium are disclosed for selecting system configurations for validation testing. One embodiment provides a computer-implemented method that includes determining all valid system configurations, clustering the valid system configurations into a plurality of sets of system configurations where each member of a set of system configurations has common components, scoring configurations in each cluster using one or more scoring factors, prioritizing clusters using the scores of each cluster, and selecting a configuration for validation testing using priority of the clusters and scoring of configurations in the clusters.

In one aspect of the above embodiment, determining all valid configurations includes determining a set of base configurations, determining a set of riser slot configurations, and combining the set of base configurations with the set of riser slot configurations. In a further aspect, the set of base configurations includes all possible configurations of two or more of chassis, backplane, redundant array of independent disks (RAID) controller, riser type, and number of central processing units. In another further aspect, determining the set of riser slot configurations includes selecting components for riser slots using a probabilistic sampling and resampling process to assign probability of selection in light of one or more criteria. In still a further aspect, the one or more criteria include a number of components associated with a vendor, a number of slots into which a component can be inserted, and a number of components of a component type.

In another aspect of the above embodiment, determining all valid system configurations uses data sources that include one or more of: rules and restrictions for populating riser slots; rules and restrictions for base configurations; a parts distribution list; CPU models for a given platform release; new, unique, distinct, and difficult component identification; and, a number of units of as-sold components in previous generations of products.

In still another aspect of the above embodiment, clustering the valid system configurations includes generating a singular value decomposed (SVD) translated matrix from the valid system configurations information, and performing a plurality of clustering methods on the SVD translated matrix. In a further aspect, performing the plurality of clustering methods on the SVD translated matrix includes performing k-means clustering on the SVD translated matrix to generate a first set of clusters, and performing Kohenon self-organizing map (SOM) neural network competitive clustering on the SVD translated matrix to generate a second set of clusters.

In yet another aspect of the above embodiment, scoring configurations in each cluster using one or more scoring factors includes, for each configuration, determining a standardized number of new, unique, distinct, and difficult components in the configuration, a standardized number of new components in the configuration, a standardized number of unique component types in the configuration, and a standardized number of as-sold components in the configuration. In a further aspect, the method includes determining a representative of each cluster where the representative has a highest score of all members of the cluster. In still a further aspect, prioritizing clusters includes ordering the representatives of each cluster.

Another embodiment of the present invention provides a system for selecting test system configurations for validation testing. The system includes a processor, a data bus coupled to the processor, and a non-transitory, computer-readable storage medium coupled to the data bus and storing instructions executable by the processor. The instructions are configured to determine all valid test system configurations, cluster the valid test system configurations into a plurality of sets of tests system configurations where each member of a set of test system configurations has common components, score configurations in each cluster using one or more scoring factors, prioritize clusters using the scores of each cluster, and select a configuration for validation test using priority of the clusters and scoring of configurations in the clusters.

In one aspect of the above embodiment, instructions configured to determine all valid test system configurations further include instructions configured to determine a set of base configurations, determine a set of riser slot configurations, and combine the set of base configurations with the set of riser slot configurations. Another aspect of the above embodiment includes a network interface, coupled to the data bus, and configured to communicate with a network and receive, from a data server coupled to the network, data sources. The data sources include one or more of rules and restrictions for populating riser slots, rules and restrictions for base configurations, a parts distribution list, CPU models for a given platform release, new, unique, distinct, and difficult components identification, and a number of units of as-sold components in previous generations of products. The instructions configured to determine all valid test system configurations use the data sources for that determination.

In another aspect of the above embodiment, the instructions configured to cluster the valid test system configurations further include instructions that are configured to generate a singular value decomposed (SVD) translated matrix from the valid system configuration information and perform a plurality of clustering methods on the SVD translated matrix. In a further aspect, the instructions configured to perform a plurality of clustering methods on the SVD translated matrix further include instructions configured to perform k-means clustering on the SVD translated matrix to generate a first set of clusters, and perform Kohenon SOM neural network competitive clustering on the SVD translated matrix to generate a second set of clusters.

In yet another aspect, the instructions configured to perform scoring configurations in each cluster using one or more scoring factors further include instructions configured to, for each configuration, determine a standardized number of new, unique, distinct, and difficult components in the configuration, a standardized number of new components in the configuration, a standardized number of unique component types in the configuration, and a standardized number of as-sold components in the configuration. In a further aspect, the computer-readable storage medium stores further instructions configured to determine a representative of each cluster where the representative has a highest score of all members of the cluster. In yet a further aspect, the instructions for prioritizing clusters includes instructions for ordering the representatives of each cluster.

Another embodiment of the present invention provides a non-transitory, computer-readable storage medium that embodies computer program code that includes instructions configured for: determining all valid system configurations; clustering the valid system configurations into a plurality of sets of system configurations where each member of a set of system configurations has common components; scoring configurations in each cluster using one or more scoring factors; prioritizing clusters using the scores of each cluster; and, selecting a configuration for validation test using priority of the clusters and scoring of configurations in the clusters.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Embodiments of the present invention provide a system, method, and computer-readable medium that engages in a data-driven and machine learning-based approach to arrive at high-value, system under test configurations for validation. Embodiments determine all the possible configurations for a computer platform, considering the variety of processors, boards, adapters, and the like, and then utilize a pseudo-ensemble clustering methodology that combines a k-means clustering technique with a neural-network based Kohenon SOM competitive clustering technique to associate like configurations, and then utilizes a data-driven scoring methodology on the clustered configurations to prioritize those configurations to be validation tested.

An advantage of modular computer system platforms is that a user is provided significant leeway in configuring a system that fits that user's specific needs. This is especially true of computer servers that can be configured to have a wide variety of components such as CPU, memory, hard drive, host bus adapter, network interface card, graphical processor unit, and the like. Each one of these components can have a variety of vendors, parts, form factors, and other options. These options magnify the permutations and combinations of configuring computer servers. Validation groups tasked with testing systems prior to distribution to users are faced with cost, bandwidth, and time constraints to physically configure even a fraction of a percentage of the millions of possible configurations.

Historical methods for determining test configurations have been based upon experience and cues from historically tested configurations. Problems with such methods of building test server configurations include, for example: (1) manually reviewing all commodities/component rules and restriction files prior to building server configurations, which is time consuming and error-prone; (2) even after building configurations, there is no good way of verifying that all different and distinct types of configurations have been optimally covered; (3) a lack of ability to determine if the configurations are of high value; and, (4) the current process lacks scientific and data-driven decisions in light of ignoring key factors, including as-sold configurations/components, as-tested configurations/components, new components, new unique distinct and difficult components, and test operations data.

Figure 1:
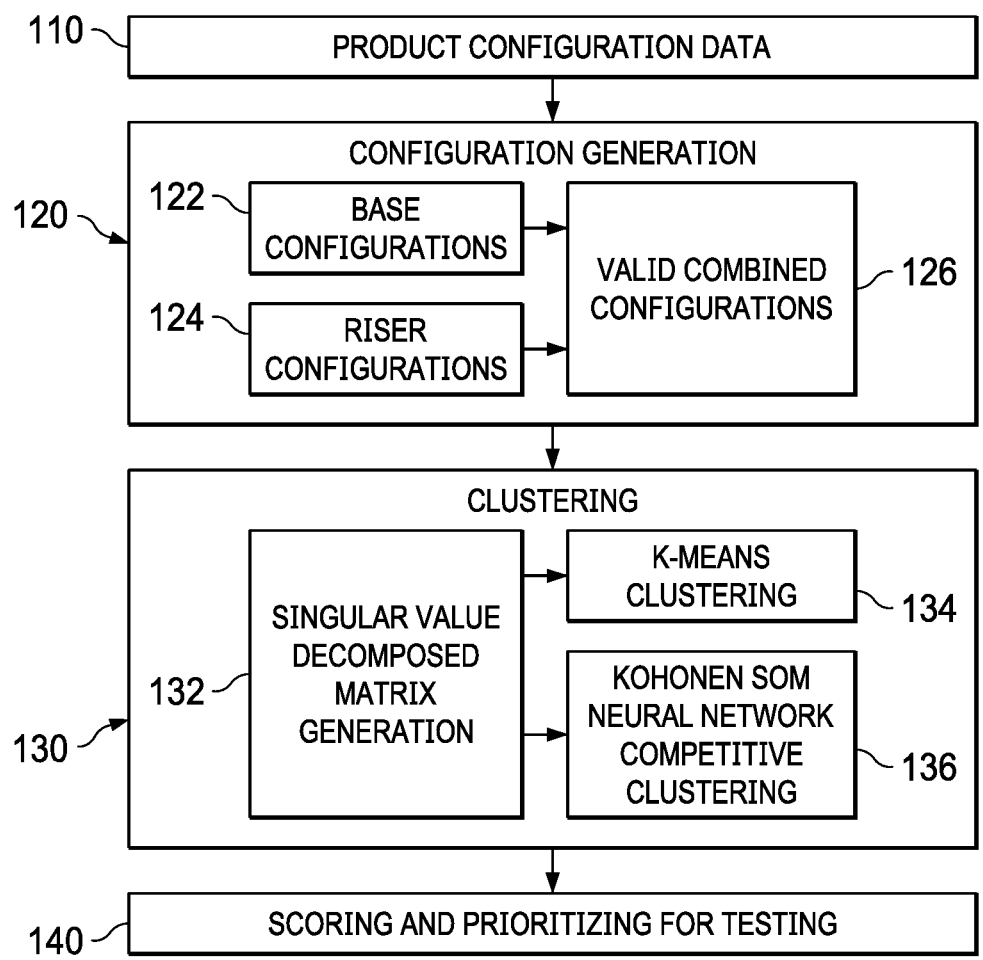
FIG. 1 is a simplified block diagram illustrating an embodiment of system that can provide a scientific, data-driven, machine learning approach to prioritizing system configurations for validation testing.

FIG. 1 is a simplified block diagram illustrating an embodiment of a system that can provide a scientific, data-driven, machine learning approach to prioritizing system configurations for validation testing. As will be discussed in greater detail below, embodiments gather component information that contributes to determining all the possible configurations of a system, and then utilizes machine learning clustering techniques to associate common configurations with one another, and then can prioritize a set of candidate configurations that can maximize coverage of validation test. While examples presented are associated with computer servers, embodiments of the present invention are not limited to providing configurations for computer servers, but any type of device that has a significant number of possible configurations requiring validation testing.

As illustrated in FIG. 1, determining a universe of possible system configurations begins with product configuration data 110. Product configuration data can include information about the various parts, components, rules for putting them together, whether certain parts are new and unique, and the like. Such information can be provided by a variety of sources, including, for example, a product group sales force or vendors to the entity configuring the systems. Examples of product configuration data sources for a computer server can include:

Slot Priority Matrix: A list of rules and restrictions to be adhered to while populating riser slots with network, graphical processing units (GPU), redundant array of independent disks controller cards, and the like. Can be treated as placeholders into which extra commodities can be added to a base server system, such as motherboard, processor, chassis, backplane, and power supply. Specifies which cards can be placed into which riser slot.

Parts Distribution List: All valid commodities from various vendors, features, and form factors available for a given new platform release. Defines all components applicable for a given new platform.

Platform Portfolio Configuration Matrix: Defines the rules and restrictions in creating base server configurations, including the chassis type, backplane, number of hard drives, number of non-volatile memory controllers, and number of software and hardware RAID controllers.

CPU Models: A listing of CPU models available for a given new platform release.

New Unique Distinct and Difficult (NUDDs) Components: New technology-based components that are released with a new server platform.

Components As Sold: A number of units sold of components in previous generations and already shipped server platforms.

The product configuration data sources can be provided by the responsible organizations for such sources to the validation entity in an appropriate data form, such as files and databases.

Product configuration data 110 is then provided to a system configured to perform configuration generation 120. Configuration generation 120 performs, as one task, generation of all possible combinations of base server configurations 122, which includes chassis, backplane, RAID controller (both software and hardware), along with riser combination type and number of CPUs needed.

As another task, configuration generation 120 determines various riser configurations 124, that is the number and placement of cards in riser slots. In one embodiment, riser configurations are generated by assigning probabilities to various parts or components. If components were randomly picked and populated in riser slots, then criteria having a large number of components (e.g., a vendor with a maximum number of part numbers, or parts with associated rules permitting them to be placed in a maximum number of slots) will arise most in final configurations built. This can result in sub-optimal coverage of components. To avoid this, probabilities are formulated and assigned to each component in such a way that component coverage can be optimized.

A probability is assigned to each component based on factors discussed below in order to ensure optimal component coverage. Once selected, the components are populated in their respective allowed riser slots per rules and restrictions defined by the Slot Priority Matrix data source. In addition, a number of CPUs for a certain riser combination is also captured from, for example, the Slot Priority Matrix data source.

The method employed for component selection is a probabilistic sampling and resampling technique. In such a technique, a component is equivalent to a part (or a part number). A commodity, on the other hand, is a type of component (e.g., GPU, CPU, hard drive, and the like). A probability is then assigned to a component within each commodity type and riser combination taking into account the following:

Vendor Prob=1/(# of components of a given vendor)
Slot Prob=1/(# of slots the component can be placed)
Commodity Prob=1/(# of components of a given commodity type)
Component Probability=Vendor Prob*Slot Prob*Commodity Prob By assigning probabilities in this manner for being selected for a configuration, embodiments can formulate as many riser configurations as possible, while ensuring that all components are covered at all riser configurations are unique. One example of an output of riser configurations 124 can include slot number, commodity identifier (or part number), and a description of the part.

Once base configurations 122 and riser configurations 124 are generated, a set of valid combined configurations 126 can be generated from the base and riser configuration information. The set of valid combined configurations is built by finding common elements in the base and riser configurations and performing an inner join. One embodiment utilizes the following common elements for forming the set of valid combined configurations for computer servers: riser number, hardware RAID controller count, number of CPUs, and boot optimized storage solution (BOSS). This results in a set of final valid configurations, where each riser configuration adheres to multiple base configuration constraints based upon the fields mentioned above. In one example, a list of final valid configurations can have the set of components listed in Table 1.

TABLE 1

| COMPONENTS | DESCRIPTION |
|---|---|
| CONFIG ID | Config Id |
| RISER NO | Riser No |
| GENERATION | Server Platform Generation |
| PLATFORM | Server Platform Number |
| BOSS | Boot Optimized Storage Solution |
| FCHBA | Fiber Channel House Bus Adapters |
| FPGA | Field Programmable Gate Array |
| GPGPU | General-purpose Computing on Graphics Processing Unit |
| NIC | Network Interface Card |
| NVMe | Non Volatile Memory |
| RAID | Redundant Array of Independent Disks |
| CPU | Central Processing Units |
| CHASSIS | Chassis |
| BACKPLANE | Backplane |
| SW RAID | Software Redundant Array of Independent Disks |

A number of valid combined configurations 126 for a computer server system can number into hundreds of thousands, and even into the millions. In order to make this number of possibilities more manageable, embodiments of the present invention use clustering techniques 130 to group all similar configurations within the set of valid combined configurations 126. By using clustering techniques 130, followed by a scoring and prioritization model 140, optimal configuration coverage can be obtained for validation.

Figure 2:
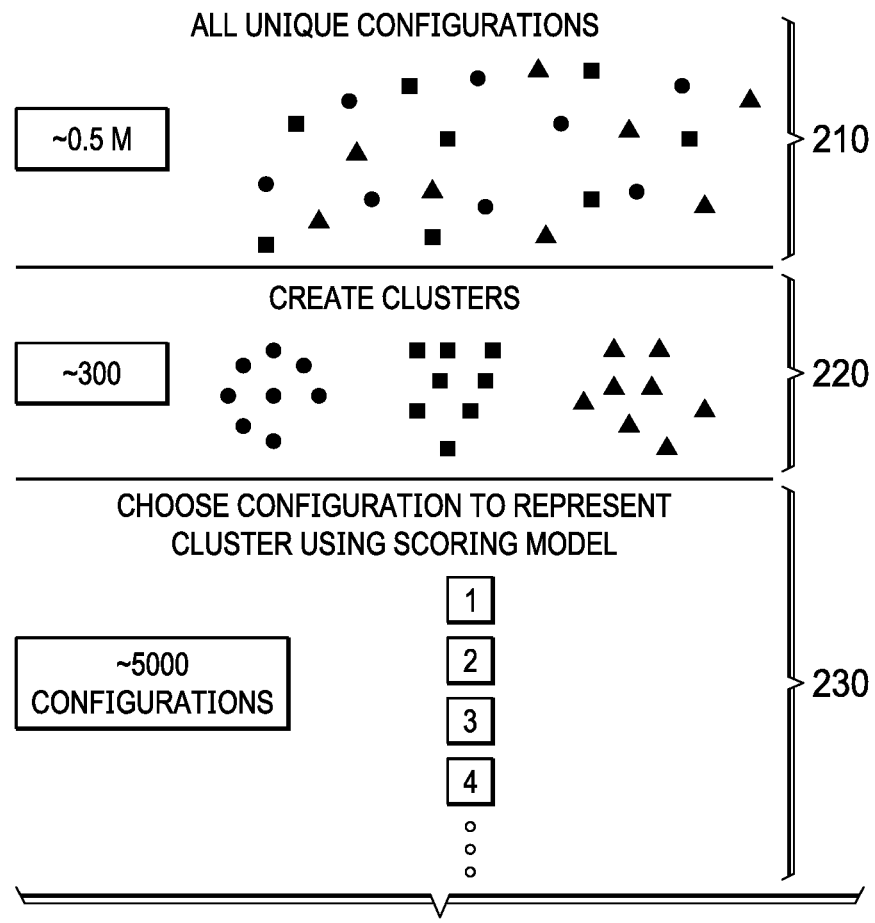
FIG. 2 is a simplified block diagram illustrating a rationale for the clustering and scoring techniques utilized by embodiments of the present invention.

FIG. 2 is a simplified block diagram illustrating a rationale for the clustering and scoring techniques utilized by embodiments of the present invention. Stage 210 in FIG. 2 depicts a scattered representation of configurations in a multidimensional space with dimensions being components and magnitude being component values/vendor/form factor/features. Stage 220 illustrates the outcome of clustering in which similar configurations are brought together where a configuration type is represented by a shape. Embodiments of the present invention ensure optimal configuration coverage where no single distinct configuration kind is left out when creating a final list of test configurations. In order to achieve optimality of configuration coverage, from each cluster of similar configurations a single best representative configuration is chosen based on a scoring model dependent on various factors associated with configuration priority, as shown at stage 230. In this manner, the presence of every configuration kind is ensured in the final list of configurations to be tested.

As illustrated in FIG. 1, embodiments utilize two different methods for clustering that use a singular value decomposed matrix generated (132) from the set of valid combined configurations (126). The clustering methods are k-means clustering 134 and Kohenon SOM Neural Network Competitive clustering 136.

Figure 3:
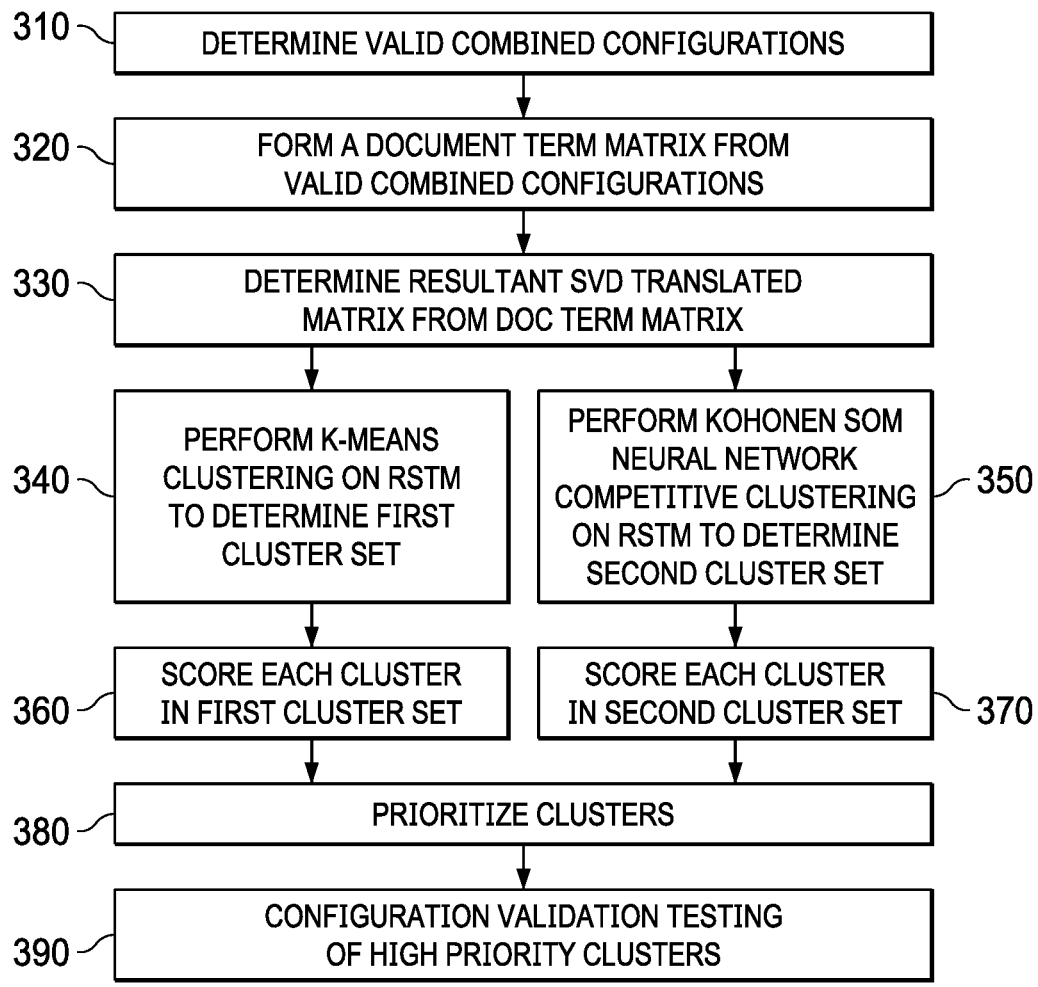
FIG. 3 is a simplified flow diagram illustrating a set of steps performed by embodiments of the present invention to prioritize clusters generated above.

FIG. 3 is a simplified flow diagram illustrating a set of steps performed by embodiments of the present invention to prioritize clusters generated above. The valid configurations are determined as described above (310). Then a document term matrix is formed from a table of the valid configurations (320). The document term matrix provides each cell with a quantity of a presence of a certain component type/component value combination. The component type and the component value are concatenated to form a distinct set of all unique components in the configurations (e.g., configuration identification is in the rows and the possible components are the columns).

A resultant singular value decomposed (SVD) translated matrix is then determined from the document term matrix (330). SVD is a linear algebra technique for reducing a matrix to its constituent parts. In this case, SVD is applied on the transpose of the document term matrix with the formula: $A = U \cdot S \cdot V^T$, in which A is the transposed document term matrix (having dimensions m×n), U is a m×m matrix containing left singular vectors of A, V is a n×n matrix containing the right singular vectors of A, and S is a m×n diagonal matrix containing the singular values of A sorted decreasingly. The Resultant SVD Translated Matrix is therefore:

$$\text{Resultant SVD Translated Matrix} = ([U]_{m*m}{}^T * \text{Configs DTM}^T)^T$$

Once the resultant SVD translated matrix (RSTM) is determined, clustering techniques are then employed on the RSTM to generate clusters of similar configurations. One example of clustering that can be performed is k-means clustering (340). k-means clustering is a vector quantization method that partitions n observations into k clusters in which each observation belongs to a cluster with a nearest mean that serves as a prototype for the cluster. There are a variety of known methods for performing k-means clustering in the art and embodiments of the present invention are not limited to a particular one of those methods. In one embodiment, an elbow heuristic method of interpretation is utilized to perform k-means clustering.

Another example of clustering that can be performed on the RSTM is a neural network-based Kohenon self-organizing map (SOM) clustering technique (350). The SOM neural network uses the number of clusters calculated in the k-means clustering method as an input parameter for a number of clusters to be generated in the SOM. The SOM, in this case, is a two-dimensional, discretized representation of the data space defined by the RSTM. SOM places neurons in a grid, and the grid adapts to the intrinsic shape of the data provided by the RSTM. The SOM grid learns a shape of the data through an iterative process. The grid is placed in the data space, a data point is selected, and a neuron that is closest to the data point is found (e.g., the "best matching unit" or BMU). The BMU is then moved closer to the data point. In addition, the BMU's neighbors are also moved closer to the data point, but with farther away neighbors moving less. This process can be repeated for each data point in the RSTM until the neurons form an approximation of the data distribution.

As illustrated in FIG. 1, once the clustering has been performed, the cluster information is passed to a scoring and prioritization process (140). All similar configurations have been grouped and each distinct cluster is dissimilar from the other clusters. At this point, a determination is made as to whether a particular configuration is of a high value and therefore a priority for validation testing. Embodiments provide a set of subject matter factors to determine whether a configuration is of "high value." Each factor is computed for every configuration built in the above steps.

While embodiments of the present invention do not require a specific set of factors, the factors considered for scoring server configurations per the examples discussed herein are: new, unique, distinct, and difficult components (NUDDs); new components; unique commodities; and, as sold components. These factors are taken into consideration in the following manner. A number of NUDDs for every configuration is counted and standardized by dividing it with a total number of components in the configuration. The NUDDs in a configuration are determined from the NUDD input file. For new components, a number of new components for every configuration is counted and standardized by dividing it with the total number of components in the configuration. The new components in a configuration are determined from the PDL input file. The unique commodities score relates to the number of unique commodities in a particular configuration and dividing that by the total number of components in the configuration. This is done because there can be multiple cards of a same commodity type in a configuration (e.g., multiple network interface cards). Finally, the as sold components score gives a higher priority to configurations that have components sold more in previous generations as compared to configurations having components that have sold relatively fewer.

While the above factors have been found to be particularly relevant in scoring configurations, additional factors may be relevant to different configuration environments. In addition, factors such as defects and other test cases may be relevant in determining prioritization of configurations.

After the scoring factors are computed for each of the clusters generated by the clustering methods, weights can be assigned to the scoring factors to arrive at a weighted sum of scoring factors (360, 370):

Final Score=(NUDD weight*NUDD score)+(New Component weight*New Component score)+(Unique Commodities weight*Unique Commodities score)+(As Sold Components weight*As Sold Components score)

Subsequently, prioritization of configurations and clusters is performed for all the clusters (380). In each cluster for each clustering method, configurations are sorted in descending order of the Final Score. The configurations that score at the top of each cluster are treated as the representative of that cluster as the final high value configuration for testing. Then the representative configurations are again sorted in descending order to prioritize the clusters in order of importance for testing.

Figure 4:
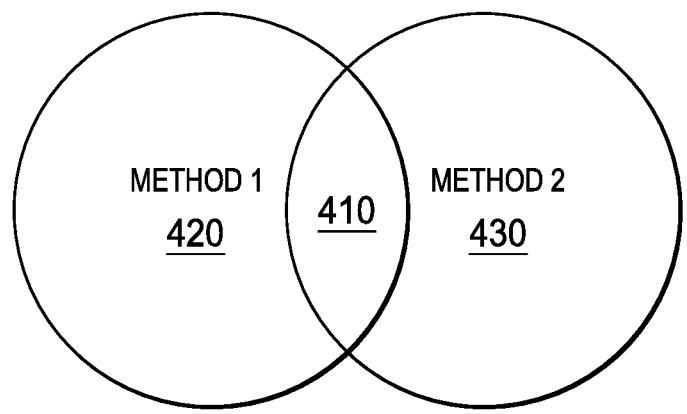
FIG. 4 is a simplified Venn diagram illustrating clusters that may fall in one or both of the clustering methods.

FIG. 4 is a simplified Venn diagram illustrating clusters that may fall in one or both of the clustering methods. Final configurations that are common in both of the clustering methods and also having high value under the scoring model (410) are prioritized as compared to distinct clusters from both lists (420, 430). If more configurations are desired to be tested than those common to both methods of clustering, selection of representatives of those distinct configurations can be made in light of priority or in light of which clustering method is performing better. Once the high value clusters and their representative configurations are chosen, those configurations can be validation tested to ensure the configuration can be sold (390).

Embodiments of the present invention allow verification testers to build as many riser configurations as practically possible by assigning probabilities to components. Embodiments assign probabilities to each component based on factors like the number of components from a given vendor, number of slots a component is permitted to occupy, and number of components for a given commodity type, which helps to ensure optimal component coverage. Once selected, the components are populated in their respective allowed slots as per rules and restrictions defined by data sources. Otherwise, if the components were randomly picked and populated, then commodities with the most components, or the vendor with the most components, or the parts being able to be placed in the most slots would dominate the final configurations—which would result in sub-optimal coverage of components. Instead, probabilistic sampling and resampling is performed to ensure optimal component coverage. Further, the clustering performed by multiple cluster methods, along with a data-driven, weighted scoring model, allow narrowing down the number of possible configurations to a set of high value test configurations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 5:
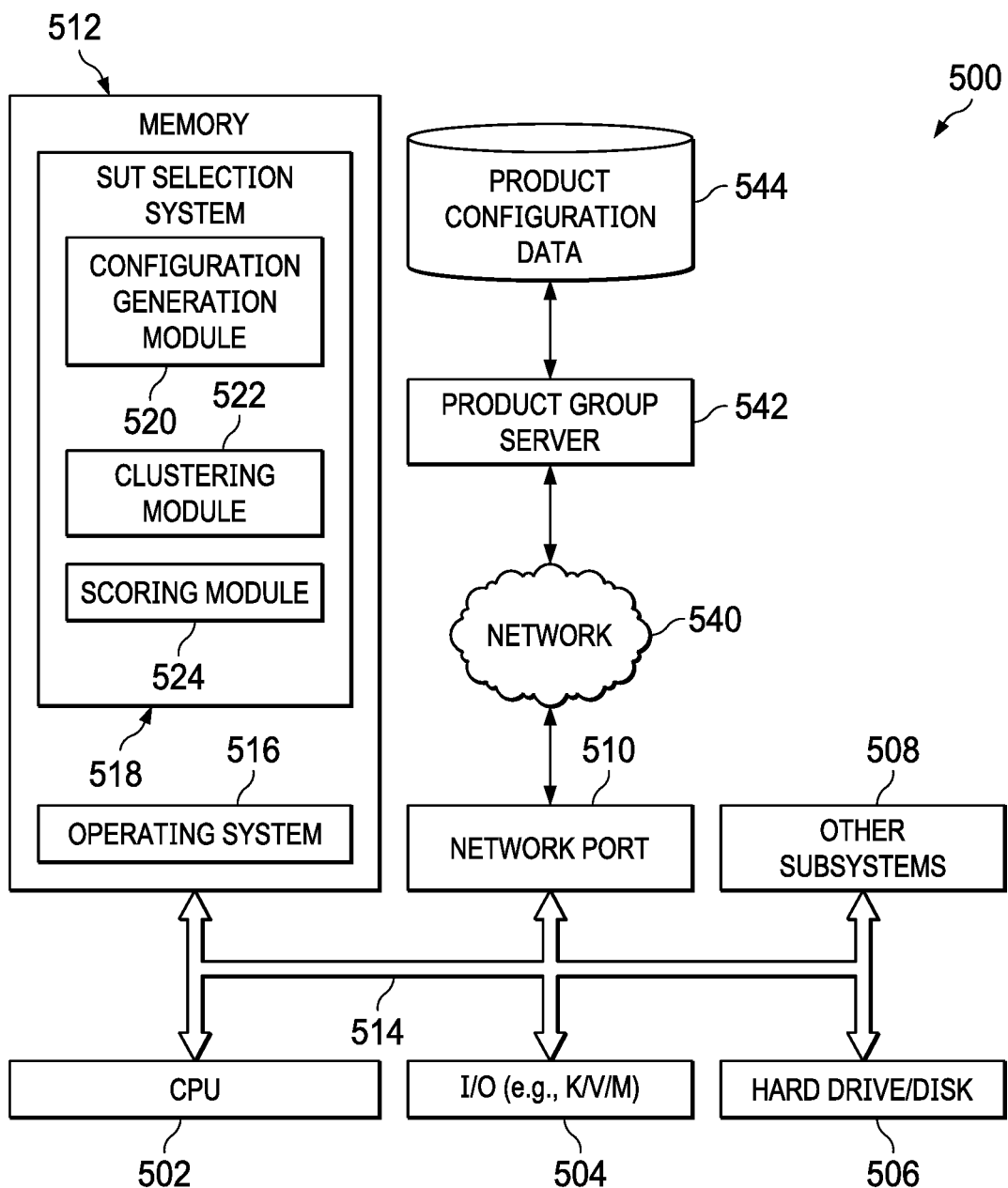
FIG. 5 is a generalized illustration of an information handling system 500 that can be used to implement the system and method of the present invention.

FIG. 5 is a generalized illustration of an information handling system 500 that can be used to implement the system and method of the present invention. The information handling system 500 includes a processor (e.g., central processor unit or "CPU") 502, input/output (I/O) devices 504, such as a display, a keyboard, a mouse, and associated controllers, a hard drive or disk storage 506, and various other subsystems 508. In various embodiments, the information handling system 500 also includes network port 510 operable to connect to a network 540, which is likewise accessible by a service provider server 542. The information handling system 500 likewise includes system memory 512, which is interconnected to the foregoing via one or more buses 514. System memory 512 further comprises operating system (OS) 516 and in various embodiments also comprises a System Under Test Selection System 518, embodiments of which have been described above.

System Under Test Selection System 518 can include a Configuration Generation module 520, Clustering module 522, and a Scoring module 524. Configuration Generation module 520 can be configured to perform the tasks related to configuration generation discussed above with respect to element 120 of FIG. 1. Clustering module 522 can be configured to perform the tasks related to SVD and clustering as discussed above with respect to element 130 of FIG. 1. Scoring module 524 can be configured to perform the tasks related to scoring and prioritizing for testing as discussed above with respect to element 140 of FIG. 1.

As will be appreciated, once the information handling system 500 is configured to perform the System Under Test Selection operations, the information handling system 500 becomes a specialized computing device specifically configured to perform the above operations and is not a general purpose computing device. Moreover, the implementation of the System Under Test Selection operations on the information handling system 500 provides a useful and concrete result of prioritizing system configurations for testing by validation engineers.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A method for selecting system configurations to validation test, the method comprising:
    determining all valid system configurations;
    clustering the valid system configurations into a plurality of sets of system configurations, wherein each member of a set of system configurations has common components;
    scoring configurations in each cluster using one or more scoring factors wherein for each configuration, determining a standardized number of new, unique, distinct, and difficult components in the configuration, a standardized number of new components in the configuration, a standardized number of unique component types in the configuration, and a standardized number of as-sold components in the configuration;
    prioritizing clusters using the scores of each cluster; and
    selecting a configuration for validation test using priority of the clusters and scoring of configurations in the clusters.

2. The method of claim 1 wherein said determining all valid configurations comprises:
    determining a set of base configurations;
    determining a set of riser slot configurations;
    combining the set of base configurations with the set of riser slot configurations.

3. The method of claim 2 wherein the set of base configurations comprises all possible configurations of two or more of chassis, backplane, redundant array of independent disks (RAID) controller, riser type, and number of central processing units (CPUs).

4. The method of claim 2 wherein said determining the set of riser slot configurations comprises selecting components for riser slots using a probabilistic sampling and resampling process to assign probability of selection in light of one or more criteria.

5. The method of claim 4 wherein the one or more criteria comprise:
    a number of components associated with a vendor;
    a number of slots into which a component can be inserted; and
    a number of components of a component type.

6. The method of claim 1 wherein said determining all valid system configurations uses data sources comprising one or more of:
    rules and restrictions for populating riser slots;
    rules and restrictions for base configurations;
    a parts distribution list;
    CPU models for a given platform release; new, unique, distinct, and difficult component identification; and
    a number of units of as-sold components in previous generations of products.

7. The method of claim 1 wherein said clustering the valid system configurations comprises:
    generating a singular value decomposed (SVD) translated matrix from the valid system configurations information;
    performing a plurality of clustering methods on the SVD translated matrix.

8. The method of claim 7 wherein said performing the plurality of clustering methods on the SVD translated matrix comprises:
    performing k-means clustering on the SVD translated matrix to generate a first set of clusters; and
    performing Kohenon self-organizing map (SOM) neural network competitive clustering on the SVD translated matrix to generate a second set of clusters.

9. The method of claim 1 further comprising: determining a representative of each cluster wherein the representative has a highest score of all members of the cluster.

10. The method of claim 9 wherein said prioritizing clusters comprises ordering the representatives of each cluster.

11. A system for selecting test system configurations for validation testing, the system comprising:
    a processor;
    a data bus coupled to the processor;
    a non-transitory, computer-readable storage medium, coupled to the data bus, and storing instructions executable by the processor, the instructions configured to determine all valid test system configurations,
cluster the valid test system configurations into a plurality of sets of test system configurations, wherein each member of a set of test system configurations has common components,
score configurations in each cluster using one or more scoring factors further comprising for each configuration, determine: a standardized number of new, unique, distinct, and difficult components in the configuration; a standardized number of new components in the configuration; a standardized number of unique component types in the configuration; and a standardized number of as-sold components in the configuration,
prioritize clusters using the scores of each cluster, and
select a configuration for validation test using priority of the clusters and scoring of configurations in the clusters.

12. The system of claim 11 wherein the instructions configured to:
determine all valid test system configurations further comprise instructions configured to:
determine a set of base configurations; determine a set of riser slot configurations;
combine the set of base configurations with the set of riser slot configurations.

13. The system of claim 11 further comprising:
a network interface, coupled to the data bus, and configured to communicate with a network and receive, from a data server coupled to the network, data sources comprising one or more of
rules and restrictions for populating riser slots,
rules and restrictions for base configurations,
a parts distribution list,
CPU models for a given platform release,
new, unique, distinct, and difficult components identification, and
a number of units of as-sold components in previous generations of products; wherein the instructions configured to determine all valid test system configurations use the data sources for said determining.

14. The system of claim 11 wherein the instructions configured to cluster the valid test system configurations further comprising instructions configured to
generate a singular value decomposed (SVD) translated matrix from the valid system configuration information; and
perform a plurality of clustering methods on the SVD translated matrix.

15. The system of claim 14 wherein the instructions configured to perform a plurality of clustering methods on the SVD translated matrix further comprise instructions configured to
perform k-means clustering on the SVD translated matrix to generate a first set of clusters; and
perform Kohenon SOM neural network competitive clustering on the SVD translated matrix to generate a second set of clusters.

16. The system of claim 11 wherein the computer-readable storage medium stores further instructions configured to determine a representative of each cluster wherein the representative has a highest score of all members of the cluster.

17. The system of claim 16 wherein the instructions for prioritizing clusters comprises instructions for ordering the representatives of each cluster.

18. A non-transitory, computer-readable storage medium embodying computer program code, the computer program code comprising computer executable instructions configured for:
determining all valid system configurations;
clustering the valid system configurations into a plurality of sets of system configurations, wherein each member of a set of system configurations has common components;
scoring configurations in each cluster using one or more scoring factors wherein for each configuration, determining a standardized number of new, unique, distinct, and difficult components in the configuration, a standardized number of new components in the configuration, a standardized number of unique component types in the configuration, and a standardized number of as-sold components in the configuration;
prioritizing clusters using the scores of each cluster;
selecting a configuration for validation test using priority of the clusters and scoring of configurations in the clusters.

* * * * *